(12) United States Patent
Malka et al.

(10) Patent No.: US 7,365,753 B2
(45) Date of Patent: Apr. 29, 2008

(54) TEXTURE ENGINE STATE VARIABLE SYNCHRONIZER

(75) Inventors: Gabi Malka, Haifa (IL); Zeev Sperber, Zichron Yaakov (IL); Yael Shenhav, Haifa (IL)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 11/191,057

(22) Filed: Jul. 28, 2005

(65) Prior Publication Data

US 2005/0264579 A1    Dec. 1, 2005

Related U.S. Application Data

(63) Continuation of application No. 09/963,547, filed on Sep. 27, 2001, now Pat. No. 6,947,053.

(51) Int. Cl.
G09G 5/00    (2006.01)

(52) U.S. Cl. .................. 345/582; 345/505; 345/506

(58) Field of Classification Search ........ 345/501–503, 345/505–506, 534.5, 535, 552, 629, 643, 345/570, 572, 581–588
See application file for complete search history.

(56) References Cited

U.S. PATENT DOCUMENTS 6,333,744 B1 * 12/2001 Kirk et al. .................. 345/506
6,426,753 B1 * 7/2002 Migdal ....................... 345/506
6,525,737 B1 * 2/2003 Duluk et al. ................ 345/506
6,618,053 B1 * 9/2003 Tanner ........................ 345/552

* cited by examiner

Primary Examiner—Richard Hjerpe
Assistant Examiner—Mansour M. Said
(74) Attorney, Agent, or Firm—Kenyon & Kenyon LLP

(57) ABSTRACT

A mechanism for synchronizing state variables used by texture pipelines in a multi-pipeline graphics texture engine. The mechanism ensures that, as polygons are processed by a texture engine, the state variables associated with each polygon are distributed in parallel to each texture pipeline, regardless of whether the texture engine is processing a single texture or a blend of different textures. When the texture engine processes a blend of different textures, signals controlling the operation of multiple texture pipelines are asserted. However, when the texture engine processes a single texture for a polygon, an embodiment of the invention continues to distribute received state variables to each of the texture pipelines, but only triggers the processing portion of the texture pipeline performing the single texture operation. The processing portions of the remaining texture pipelines may not be not triggered. Thus, the invention maintains the consistency of received polygon state variables across parallel texture pipelines while simultaneously providing for efficient use of a multi-pipeline texture engine by triggering only one texture pipeline when a single texture operation is required.

7 Claims, 5 Drawing Sheets

TEXTURE ENGINE STATE VARIABLE SYNCHRONIZER

RELATED APPLICATIONS

The present application is a continuation of U.S. patent application Ser. No. 09/963,547 filed on Sep. 27, 2001 now U.S. Pat. No. 6,947,053.

BACKGROUND OF THE INVENTION

The present invention relates to high performance texture mapping in a graphics processor. More specifically, the invention relates to a method and apparatus for maintaining the consistency of state variables used by parallel texture pipelines in a multi-pipeline texture engine, regardless of whether the texture engine is processing a single texture or a blend of different textures.

As is known, a graphics processor may be organized as a pipeline, comprising a sequence of processing elements that together generate a picture image composed of graphics objects. The specific processing elements of a pipelined graphics processor may vary. A pipelined graphics processor may contain a texture engine for the purpose of applying textures to the surfaces of graphics polygons. The individual components of a texture engine may themselves be arranged in a pipeline as well, thereby achieving additional efficiency. Such pipelined texture engines may be programmed using state variables. As each polygon moves through the various stages of the texture engine pipeline, the values of the programmer-supplied state variables may determine the specific textures to be used by the pipeline, as well as the individual texture operations the texture engine may perform to process the polygon. The final product of a texture engine may consist of an output stream of texels corresponding to the picture elements of texture-mapped polygons.

For an extended treatment on methods of graphics visualization and texture mapping, see Foley, van Dam, et al., Computer Graphics—Principles and Practice (2d Ed. 1990 Addison Wesley, corr. 1995).

The process of scaling a texture in order to apply it to a polygon surface may be computationally expensive. Accordingly, it is known in the art to provide several different versions of a texture map, each associated with a different level of detail. These different texture levels typically are developed in advance, so they may be available as needed. During rendering operations, the graphics system may select a texture level most suitable for rendering a particular polygon surface so as to reduce the complexity of texture scaling operations. Once a level of texture detail has been selected, any of a number of techniques known in the art may be used to filter and map the texture to the polygon surface.

Multi-texturing is a general technique known in the art for blending textures together to create a multi-textured effect. Linear filtering and trilinear filtering are examples of multi-texturing techniques that blend adjacent levels of the same texture. As is also known, entirely different textures may also be blended to create a variety of visual effects.

A conventional single texture pipeline may implement texture blending by providing appropriate state variable programming capabilities corresponding to individual texture operations. In these single texture pipeline architectures, only one texture effect may be processed at a time. Therefore, multi-texturing effects may be implemented in single texture pipeline systems by processing the desired combination of texture operations serially.

To improve the processing speed of multi-texturing operations, separate texture pipelines may be configured to operate in parallel. In such a multiple texture pipeline architecture, each individual texture pipeline may apply a different texture to the same polygon at substantially the same time. Alternatively, each texture pipeline may simultaneously apply a different level of detail of the same texture to a polygon.

Because each individual texture pipeline in a multiple texture pipeline architecture may be capable of operating independently, separate state variable programming interfaces and control signals may be required to manage each individual pipeline. However, the additional state variable interfaces and control signals of multiple texture pipelines require an added level of complexity over the corresponding interfaces and control signals found in single texture pipelines. Additionally, graphics software that has been designed to utilize a single texture pipeline interface may be ineffective or inoperable in a multiple texture pipeline architecture.

Accordingly, there is a need in the art for a technique to support a multiple texture pipeline architecture using the same programming and control interface that supports a single texture pipeline architecture. More specifically, there is a need in the art for a technique to maintain the consistency of control signals and programmer-supplied state variables that together control the operation of independent texture pipelines in a multiple texture pipeline architecture using a single texture pipeline software interface. Additionally, there is a need in the art to maintain the consistency of state variables used by independent texture pipelines, while allowing a programmer to create all possible sequences of single texture and multiple texture effects. Finally, there is a need in the art for a mechanism that reduces power consumed by multiple texture pipelines when only a single texture pipeline is required.

DETAILED DESCRIPTION

Embodiments of the present invention provide a mechanism for maintaining the consistency of polygon state variables that are shared between parallel texture pipelines. According to an embodiment, the mechanism ensures that, as polygons are processed by a multiple pipeline texture engine, the state variables associated with each polygon are continually supplied in parallel to each texture pipeline, regardless of whether the texture engine is processing a polygon having a single texture (which may require only one pipeline) or a blend of different textures (which may employ multiple pipelines to process different textures of the polygon synchronously). When the texture engine processes a blend of different textures, an embodiment activates multiple texture pipelines. However, when the texture engine processes a polygon having only a single texture, an embodiment of the invention continues to supply multiple texture pipelines with identical state variables, but the invention selectively advances the processing portion of only one texture pipeline, without advancing the processing portion of other texture pipelines. This technique provides for more efficient use of the texture engine by employing only one texture pipeline for single texture operations, thus saving power. Additionally, because the state variables are supplied in parallel to all texture pipelines simultaneously, switching between a single texture operation and a multiple texture operation may occur without additional setup procedures and without an associated delay. The embodiment further permits control through a single pipeline control interface, thus enabling a multiple pipeline texture engine to be incorporated into a graphics system that previously supported only a single pipeline texture engine, without the need to modify previously-developed graphics software.

Embodiments of the present invention contemplate the integration of multiple texture pipeline components constructed according to architectures that are known in the art. Additionally, the design of the present invention may be used cooperatively with known architectures and interfaces. For convenience and ease of illustration, several embodiments of the present invention describe only two component texture pipelines. Without loss of generality, it can be appreciated that multiple texture pipelines are covered by these teachings and fall within the spirit and scope of the appended claims.

Figure 1:
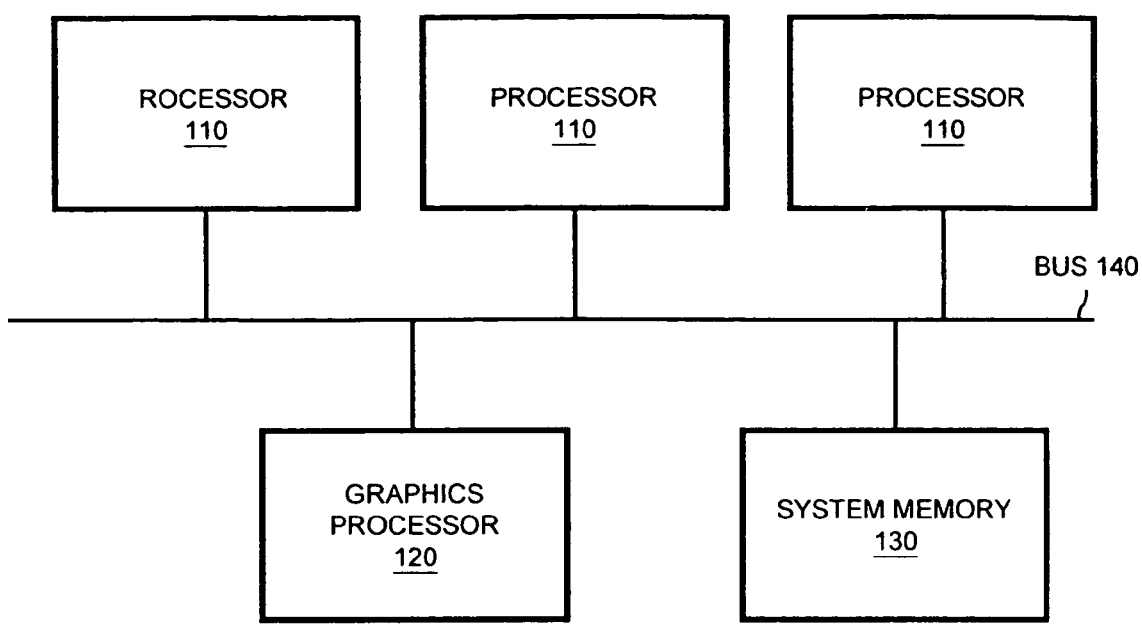
FIG. 1 is a high-level block diagram of a computer system incorporating a computer graphics device, in accordance with an embodiment of the present invention.

FIG. 1 is a high-level block diagram of a computer system incorporating a computer graphics device, in accordance with an embodiment of the present invention. The system may include a bus 140 in communication with various processors 110, a system memory module 130, and a computer graphics device 120 incorporating a texture engine state variable synchronizer according to other embodiments of the present invention.

Figure 2:
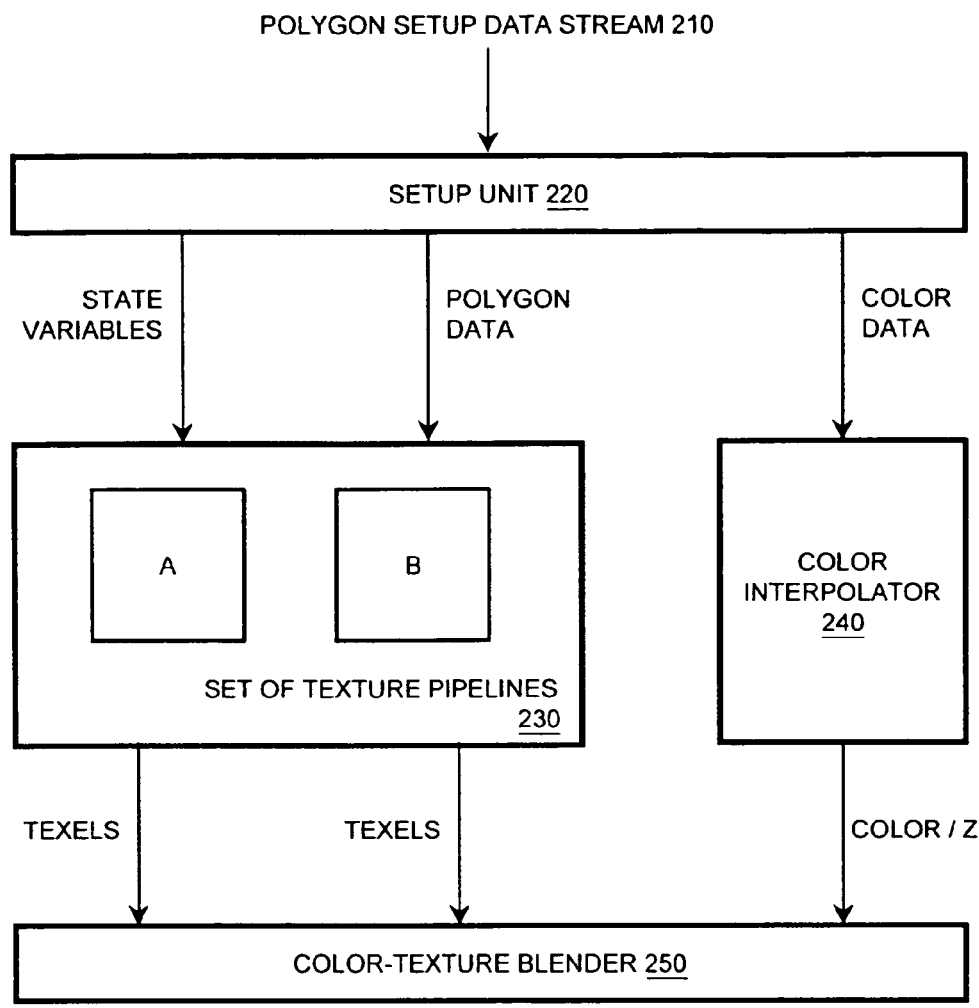
FIG. 2 is block diagram of a computer graphics device incorporating multiple texture pipelines, in accordance with an embodiment of the present invention.

FIG. 2 is a block diagram of a computer graphics device 120 (see FIG. 1) incorporating multiple texture pipelines according to an embodiment of the present invention. The graphics device 120 may include a setup unit 220, a set of multiple texture pipelines 230, a color interpolator 240, and a color-texture blender 250. The setup unit 220 may receive polygon data and corresponding state variables through a polygon setup data stream 210 and may in turn supply the received state variables to the set of texture pipelines 230. The setup unit 220 may also supply received polygon data to the set of texture pipelines 230 through a separate interface. The setup unit 220 further may supply polygon color data to the color interpolator 240. As polygons are processed by the set of texture pipelines 230 and the color interpolator 240, the generated texture elements (texels) and interpolated color and Z buffer information may be blended in the color-texture blender 250 to form the final colors of the generated pixels.

Figure 3:
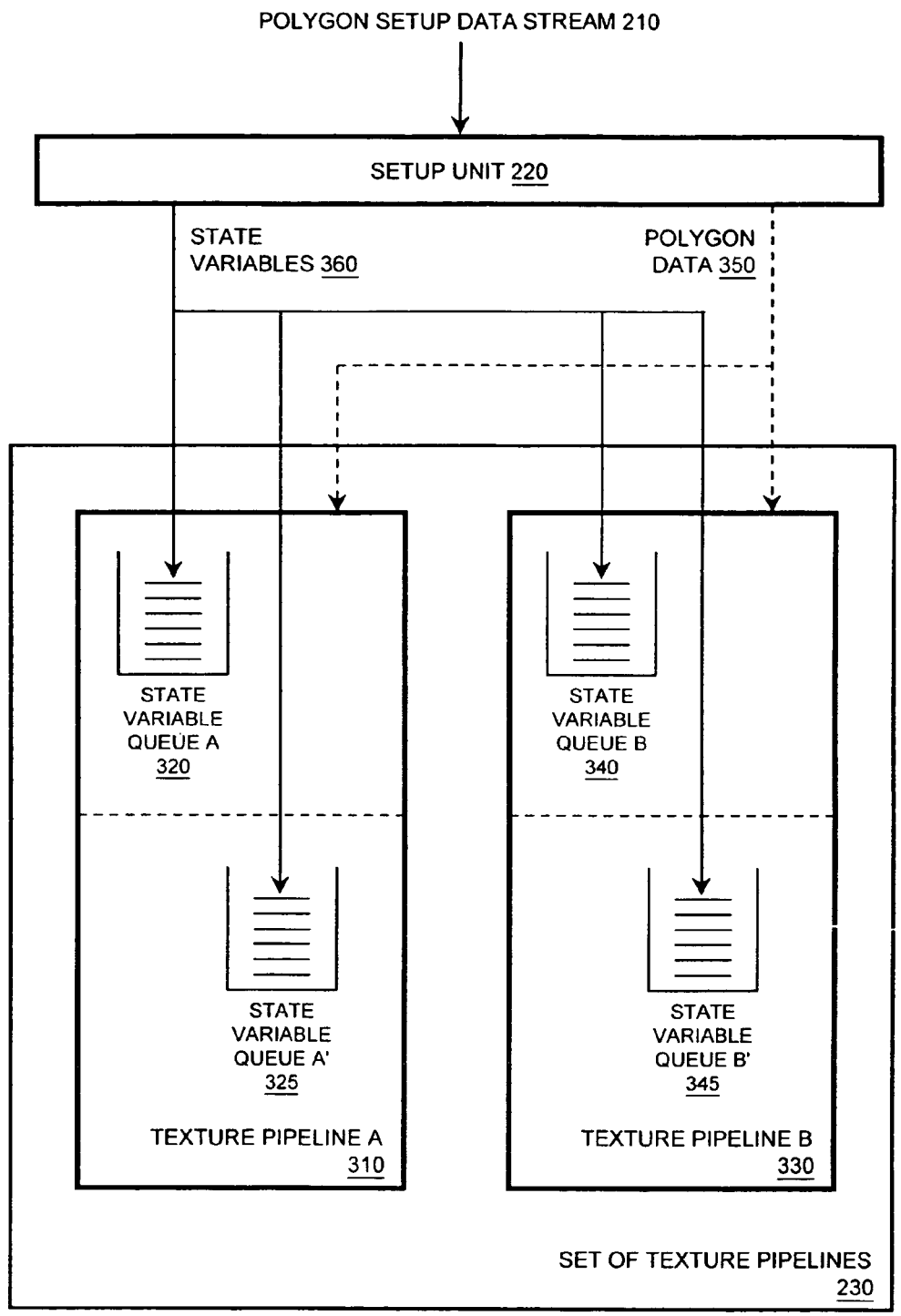
FIG. 3 is a high-level block diagram of a set of texture pipelines constructed in accordance with an embodiment of the present invention.

FIG. 3 is a high-level block diagram of a set of texture pipelines constructed in accordance with an embodiment of the present invention. FIG. 3 further illustrates the interaction between the setup unit 220 and the set of texture pipelines 230 first presented in FIG. 2. As is known, texture pipelines may accumulate and queue programmer-supplied state variables and polygon data that together describe various graphics and texture operations for defined polygons. Accordingly, when the setup unit 220 receives data via the polygon setup data stream 210, the setup unit 220 may forward state variables 360 to texture pipeline A 310 via state variable queue A 320. Simultaneously, the setup unit 220 may also forward the same state variables 360 to texture pipeline B 330 via state variable queue B 340. Additionally, the setup unit 220 may forward polygon data 350 to each texture pipeline A 310 and B 330 via known texture pipeline data channels. As is also known, a texture pipeline may comprise a plurality of processing sections, each of which may perform a different texture-related operation on a polygon, as governed by one or more programmer-supplied state variables 360.

The individual stages of each processing section in a texture pipeline may each be directed by a separate state variable queue. For example, texture pipeline A 310 may have a first processing section controlled by state variable queue A 320 and a second processing section controlled by state variable queue A' 325. Similarly, texture pipeline B 330 may have a first processing section controlled by state variable queue B 340 and a second processing section controlled by state variable queue B' 345.

Each individual stage of a processing section in a texture pipeline may be associated with a corresponding stage of its associated state variable queue. As polygon data advances through the stages of a processing section of a texture pipeline (and possibly is operated upon by these stages), the state variable data may advance through the corresponding stages of the associated state variable queue. Thus, continuing to refer to FIG. 3, the individual stages of state variable queue A 320 may correspond to individual stages of a first processing section of texture pipeline A 310. Similarly, the individual stages of state variable queue A' 325 may correspond to individual stages of a second processing section of texture pipeline A 310. Likewise, the individual stages of state variable queue B 340 may correspond to individual stages of a first processing section of texture pipeline B 330. In the same way, the individual stages of state variable queue B' 345 may correspond to individual stages of a second processing section of texture pipeline B 330.

According to an embodiment, each state variable queue may receive state variables 360 substantially simultaneously. Thus, state variable queues A 320 and A' 325, as well as state variable queues B 340 and B' 345 may each receive state variables 360 at the same time.

Figure 4:
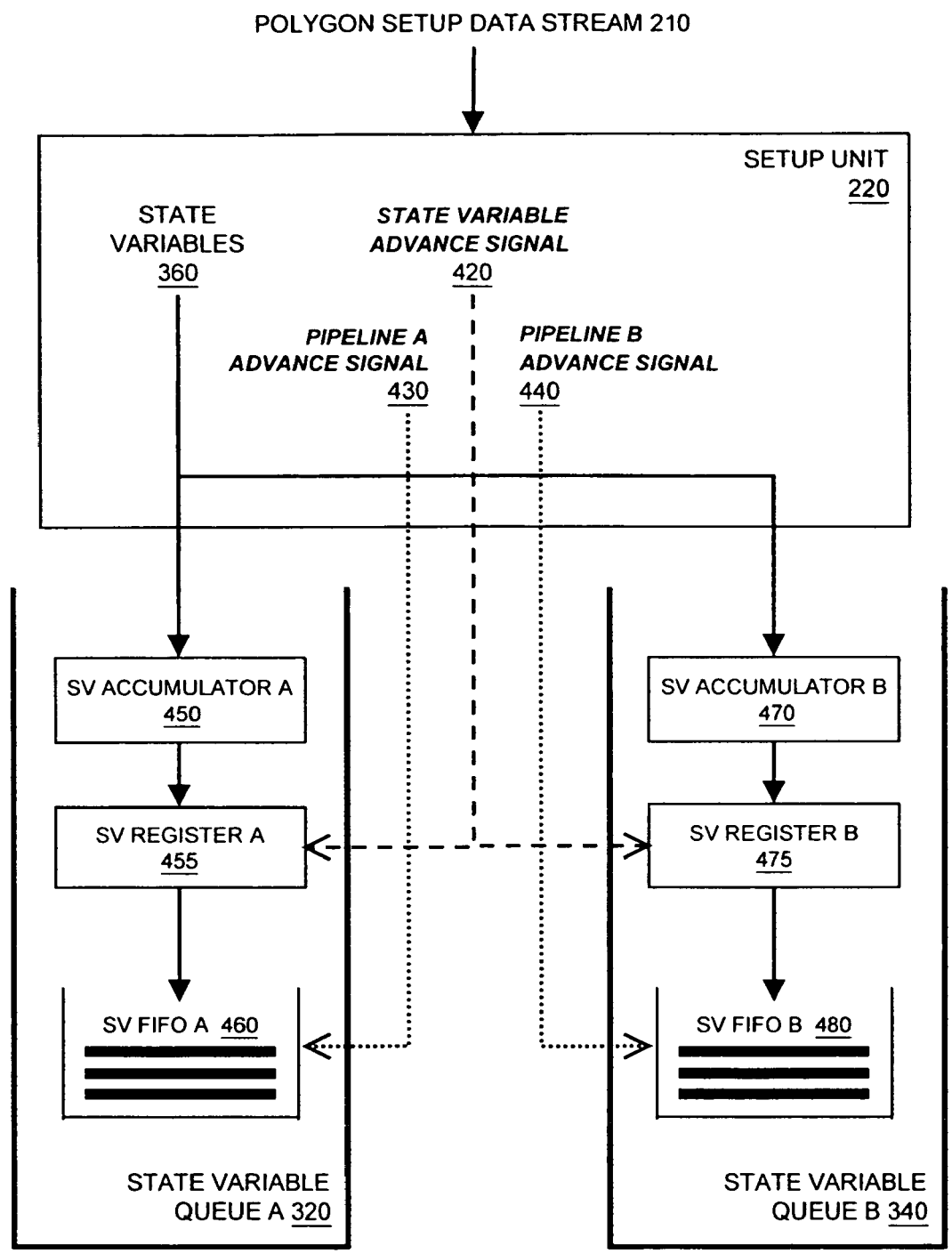
FIG. 4 is a block diagram of the primary elements of a texture engine state variable synchronizer, according to an embodiment of the present invention.

According to an embodiment illustrated in FIG. 4, the setup unit 220 may control the operation of the state variable synchronizer. The setup unit 220 may receive a polygon setup data stream 210 comprising a plurality of polygons 350 (FIG. 3) and associated state variables 360 (FIGS. 2-3). State variables 360 may contain primitive polygon drawing attributes including, for example, transparency values and texturing instructions.

Whenever the setup unit 220 receives a new state variable 360 via the polygon setup data stream 210, the setup unit 220 may then forward the received state variable 360 simultaneously to state variable queue A 320 and also to state variable queue B 340. Similarly, whenever the setup unit 220 receives new polygon data via the polygon setup data stream 210, the setup unit 220 may forward the polygon data to each texture pipeline through a separate interface (not shown in FIG. 4). In this manner, texture pipeline A 310 (FIG. 3) and texture pipeline B 330 (FIG. 3) receive copies of received polygon data 350 and state variables 360 at substantially the same time. Similarly, state variable queues A 320 and B 340 receive copies of all received state variables 360 at substantially the same time.

Continuing to refer to FIG. 4, an embodiment of the present invention may further partition each of the state variable queues A 320 and B 340 into a staging portion and a processing portion. The staging portions of each state variable queue operate continuously to receive and finalize all state variables 360. Specifically, the staging portion of state variable queue A 320 may include a state variable accumulator A 450 to receive copies of state variables 360 and may also include a state variable latching register A 455 to hold a complete set of finalized state variables for polygon texture processing by texture pipeline A 310 (FIG. 3). Similarly, the staging portion of state variable queue B 340 may include a state variable accumulator B 470 to receive copies of state variables 360 and may also include a state variable latching register B 475 to hold a complete set of finalized state variables for polygon texture processing by texture pipeline B 330 (FIG. 3).

Once the staging portions of each state variable queue have received the state variables associated with a polygon, the processing portions may be triggered to initiate the required pipelined texture operations. The processing portion of state variable queue A 320 is controlled by state variable FIFO A 460, whose internal stages correspond to internal stages of one section of texture pipeline A 310 (FIG. 3). The processing portion of state variable queue B 340 is controlled by state variable FIFO B 480, whose internal stages similarly correspond to internal stages of one section of texture pipeline B 330 (FIG. 3).

Thus, according to an embodiment, the present invention continuously accumulates state variables in staging portions of each state variable queue, while selectively enabling the processing portions of the individual state variable queues as required to achieve the desired texture effects. For single texture operations, the processing portion of only one state variable queue may be enabled. Alternatively, for multiple texture operations, a multiple of state variable queues may be enabled substantially simultaneously.

As is also illustrated in FIG. 4, an embodiment of the present invention may employ the setup unit 220 to assert three different control signals. The setup unit 220 may assert the state variable advance signal 420 to cause the state variables, which have been received in state variable accumulators A 450 and B 470, to be transferred simultaneously to their respective state variable latching registers A 455 and B 475. Thus, the state variable advance signal 420 affects all state variable queues at substantially the same time.

In contrast, pipeline advance signals 430 and 440 may operate individually to activate only the texture processing portions of each respective texture pipeline. According to an embodiment, each of these signals may cause the state variables contained in a state variable latching register to be transferred to a corresponding state variable FIFO, from which a pipelined texture operation will be controlled. Thus, as illustrated in FIG. 4, pipeline A advance signal 430 may initiate the texture processing operation of state variable queue A 320. When asserted, this signal may cause the state variables contained in state variable latching register A 455 to be transferred to state variable FIFO A 460. Similarly, pipeline B advance signal 440 may cause the state variables contained in state variable latching register B 475 to be transferred to state variable FIFO B 480.

Figure 5:
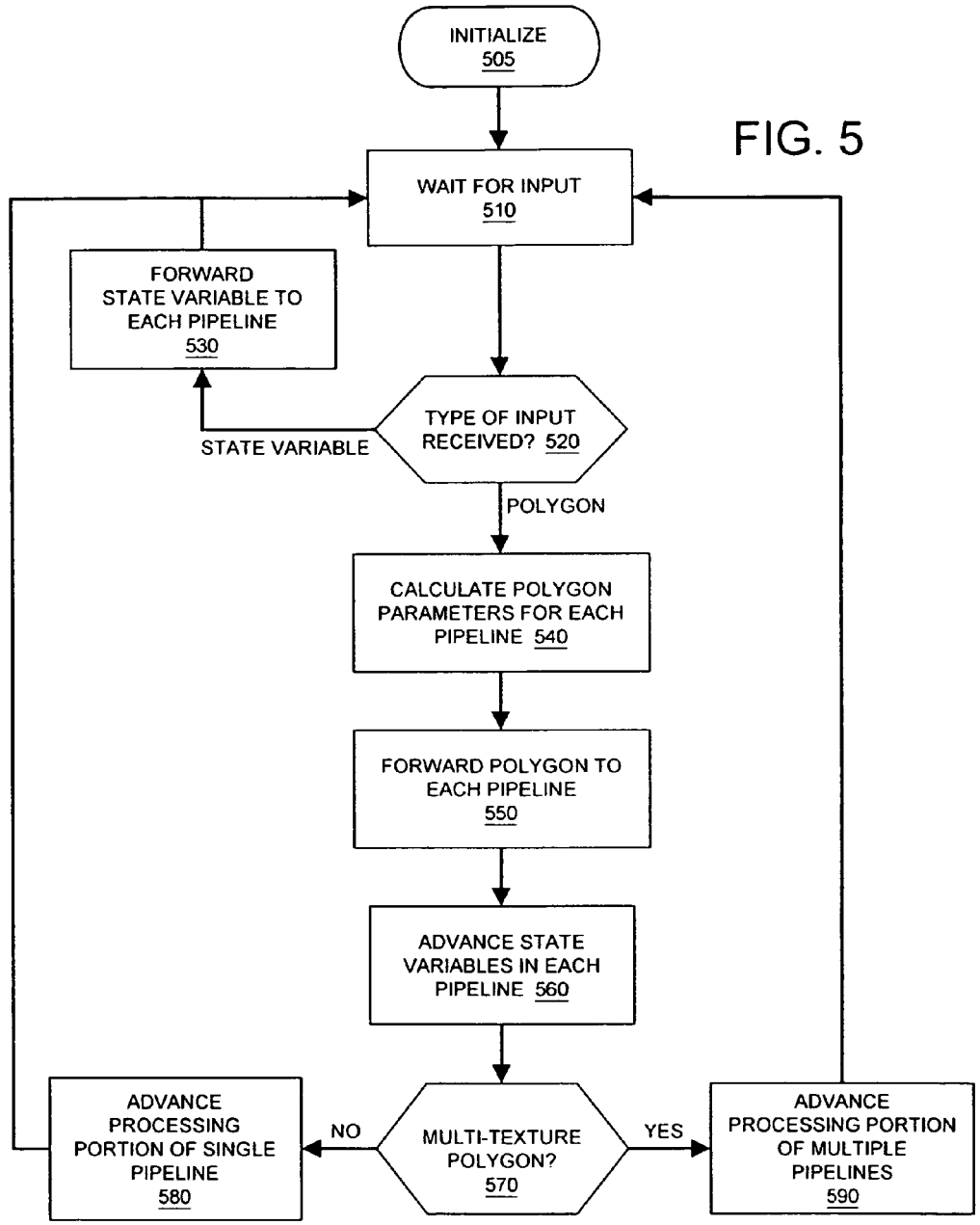
FIG. 5 is a flow diagram illustrating the operation of the state variable synchronizing control logic according to an embodiment of the present invention.

FIG. 5 is a flow diagram illustrating the operation of the state variable control logic according to an embodiment of the present invention. The operation may begin when the state variable control logic is initialized (505) and the texture engine begins to accept input from the polygon setup data stream (510). According to an embodiment, when a state variable is received (520), the setup unit 220 (FIG. 4) may forward that state variable simultaneously to the state variable accumulators of each texture pipeline (530). Similarly, if polygon data is received (520), the setup unit 220 may finalize polygon parameter calculations for each pipeline (540), and then forward the finalized polygon data simultaneously to each texture pipeline (550). Once a polygon has been received and forwarded to the texture pipelines, the setup unit 220 then asserts the state variable advance signal 420 (560), causing the state variables that have been accumulating in the state variable accumulators of each state variable queue to advance to their respective state variable latching registers. Finally, the setup unit 220 determines whether the current state variables indicate a single texture operation or a multiple texture operation (570). If the current polygon requires only a single texture, the setup unit may advance the processing portion of a single pipeline (580). This may be accomplished by the setup unit 220 (FIG. 4) asserting the pipeline A advance signal 430, which causes the state variables then residing in state variable latching register A 455 to advance to state variable FIFO A 460 (see FIG. 4). If instead, the current polygon requires a multiple texture operation (570), the setup unit may simultaneously advance the processing portion of multiple pipelines (590) by asserting a combination of pipeline advance signals. Pipeline A advance signal 430 and pipeline B advance signal 440 together cause the state variables then residing in the state variable latching registers (items 455 and 475 of FIG. 4) to advance to their respective state variable FIFO buffers (items 460 and 480 of FIG. 4). Using this procedure, multiple texture pipelines will operate at the same time when a polygon requires multi-texturing effects.

According to an embodiment, when state variable queue B 340 (FIG. 4) is not being advanced via the pipeline B advance signal 440 (FIG. 4), its state variables will nevertheless still be accumulating in state variable accumulator B 470 and state variable latching register B 475. Later, when a multi-textured polygon is received by the texture engine, the accumulated state variables in each state variable latching register (items 455 and 475 of FIG. 4) will be consistent and synchronized, and thus ready to be advanced together to process the multi-texturing effect. On the other hand, when a single texture effect is indicated, an embodiment of the present invention only advances the operation of state variable queue A via the pipeline A advance signal 430. Because pipeline B advance signal 440 is not asserted for single texture polygons, state variable queue B 340 does not advance and thus texture pipeline B 330 does not operate. Hence, less power is consumed when the texture engine processes single texture polygons.

According to another embodiment, state variables may indicate whether one or multiple textures should be applied to the current polygon during a texture operation. In a single texture operation, only one texture may be indicated. On the other hand, in a multi-texture operation, several different textures may be indicated by the state variables. To determine which texture pipeline may process each indicated texture, the otherwise identical texture pipelines may be furnished with a unique constant identifier. While processing a polygon, each texture pipeline may then use its unique identifier to determine which texture to process. The following logical equations illustrate the mechanism by which a texture pipeline may determine whether to process a first texture or a second texture:

do_texture_1:=sv_texture_1_enabled &&
(pipe_id==A)

do_texture_2:=sv_texture_1_enabled && sv_texture_2_enabled && (pipe_id==B)

In this embodiment, only texture pipeline A 310 (FIG. 3) will process texture 1. Likewise, only texture pipeline B 330 (FIG. 3) will process texture 2. Furthermore texture pipeline A 310 will process texture 1 only when Boolean variable "sv_texture_1_enabled" has been set in each pipeline. Similarly, texture pipeline B 330 will process texture 2 only when each Boolean variable "sv_texture_1_enabled" and "sv_texture_2_enabled" has been set. It can be appreciated that this embodiment will enable texture pipeline A 310 to process a single texture operation. Similarly, this embodiment will enable texture pipeline A 310 and texture pipeline B 330 to process multi-texture operations.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer system, comprising:
   a processor coupled to a bus;
   a memory in communication with the bus;
   a graphics unit in communication with the bus, the graphics unit comprising a graphics controller and a plurality of parallel texture pipelines;
   wherein each parallel texture pipeline includes a state variable queue, each state variable queue comprising an accumulation register for accumulating a set of state variables for a polygon, a latching register coupled to the accumulation register, and a state variable FIFO buffer coupled to the latching register; and
   wherein the graphics controller includes a data output coupled to the plurality of accumulation registers, the graphics controller having a first control output to trigger advancement of the set of state variables from the plurality of accumulation registers to their corresponding latching registers, and the controller having a second control output to trigger advancement of the set of state variables from a number of the latching registers to their corresponding state variable FIFO buffers, said number representing a number of parallel textures indicated by the set of state variables.

2. The texture processing system of claim 1, wherein said graphics controller further includes a data input to receive the set of state variables.

3. The texture processing system of claim 1, wherein said number of parallel textures indicated by the set of state variables is one.

4. The texture processing system of claim 3, the second control output to trigger advancement of the set of state variables from only one of the latching registers to its corresponding state variable FIFO buffer.

5. The texture processing system of claim 1, wherein said number of parallel textures indicated by the set of state variables is two.

6. The texture processing system of claim 5, the second control output to trigger advancement of the set of state variables from two of the latching registers to their corresponding state variable FIFO buffers.

7. A texture processor, comprising:
   a first parallel texture pipeline having a first state variable queue including a first accumulator for receiving polygon state variables, a first latching register interoperably connected to the first accumulator, and a first texture processing FIFO interoperably connected to the first latching register;
   a second parallel texture pipeline having a second state variable queue including a second accumulator for receiving the polygon state variables, a second latching register interoperably connected to the second accumulator, and a second texture processing FIFO interoperably connected to the second latching register;
   a controller having an input for receiving a stream of data for a polygon including the polygon state variables, said controller having a first output for forwarding the polygon state variables to the first accumulator and the second accumulator, said controller having a second output for a state variable advance signal to trigger substantially simultaneously the transfer of the polygon state variables from the first accumulator to the first latching register and to trigger the transfer of the polygon state variables from the second accumulator to the second latching register, said controller having a third output for a first pipeline advance signal to transfer the polygon state variables from the first latching register to the first texture processing FIFO, and said controller having a fourth output for a second pipeline advance signal to transfer the polygon state variables from the second latching register to the second texture processing FIFO only when the polygon state variables indicate multiple parallel texture operations.

* * * * *